United States Patent [19]
Kang

[11] Patent Number: 5,911,087
[45] Date of Patent: Jun. 8, 1999

[54] CAMERA FINDER SYSTEM

[75] Inventor: Hyoung-Won Kang, Kyeongsangnam-do, Rep. of Korea

[73] Assignee: Samsung Aerospace Industries, Ltd., Kyeongsangnam-do, Rep. of Korea

[21] Appl. No.: 08/967,905

[22] Filed: Nov. 12, 1997

[30] Foreign Application Priority Data

Nov. 13, 1996 [KR] Rep. of Korea .................... 96-53621

[51] Int. Cl.$^6$ .................................................. G03B 13/06
[52] U.S. Cl. ........................................... 396/378; 396/382
[58] Field of Search .................... 396/382, 373, 396/378

[56] References Cited

U.S. PATENT DOCUMENTS 5,694,628 12/1997 Nishitani .............................. 396/382 X Primary Examiner—W. B. Perkey
Attorney, Agent, or Firm—Finnegan, Henderson, Farabow, Garrett & Dunner, L.L.P.

[57] ABSTRACT

Camera finder systems consistent with the present invention, used for observing an object and for use with a camera, include an objective lens system for forming a first image of the object and for magnifying the first image. An inverting optical system inverts the first image received from the objective optical system. Also included is an eyepiece system for observing the inverted image received from the inverting optical system. Further, the camera finder system satisfies the following conditions:

$12 \leq D \leq 20$, and

$1.0 \leq L/D \leq 4.5$, where:

D represents a distance between an exit surface of the inverting optical system and an entrance surface of the eyepiece system; and L represents a distance between an entrance surface of the objective optical system and a first image plane.

6 Claims, 13 Drawing Sheets

Normal Position Pupil Diameter = φ4

FIG.6A  FIG.6B  FIG.6C

Telephoto Position
Pupil Diameter = φ4

Normal Position
Pupil Diameter = φ4

FIG.9B
Telephoto
Position
Pupil Diameter
= φ4

FIG.9C

CAMERA FINDER SYSTEM

BACKGROUND OF THE INVENTION

A. Field of the Invention

The present invention relates to a finder system for a camera, and, more particularly, to a camera finder system having a movable eyepiece.

B. Description of the Related Art

In general, a user views an object to be photographed through a camera finder system to determine the position of the camera during the photographic operation. The finder system is fixed to the camera's body, such as to the upper portion of a camera which has a flat, planar back cover. Thus, when the user views the object through the finder system, the user's face, and especially his or her nose, rubs against the camera's body, causing discomfort to the user. Further discomfort may be caused if the user happens to be wearing eyeglasses since the eyeglasses will also rub against the camera.

The eye relief, which is the distance between an eyepiece of a camera finder system and an eye of the user, becomes long in order to keep the user from touching the camera body. However, a long eye relief causes the view angle to become narrow making it difficult to view the object.

SUMMARY OF THE INVENTION

Finder systems consistent with the present invention provide an eyepiece system which protrudes outward from the camera only when the camera is turned ON.

To achieve this and other advantages, a camera finder system for observing an object and for use with a camera, comprises an objective lens system for forming a first image of the object and for magnifying the first image. An inverting optical system inverts the first image received from the objective optical system, and an eyepiece system is included for observing the inverted image received from the inverting optical system. The camera finder system satisfies the following conditions:

$$12 \leq D \leq 20, \text{ and}$$

$$1.0 \leq L/D \leq 4.5,$$

where:

D represents a distance between an exit surface of the inverting optical system and an entrance surface of the eyepiece system; and L represents a distance between an entrance surface of the objective optical system and a first image plane.

A further camera finder system, consistent with the present invention, for observing an object and for use with a camera, includes an objective lens system for forming a first image of the object and for magnifying the first image. An inverting optical system inverts the first image received from the objective optical system. Also included is an eyepiece system for observing the inverted image received from the inverting optical system. The eyepiece system then moves outward from the camera when the camera is turned ON, and the eyepiece system moves inward toward the camera when the camera is turned OFF.

Both the foregoing general description and the following Detailed Description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention. In the drawings.

DETAILED DESCRIPTION

Finder systems consistent with the invention will now be described with reference to the accompanying drawings.

Figure 1A:
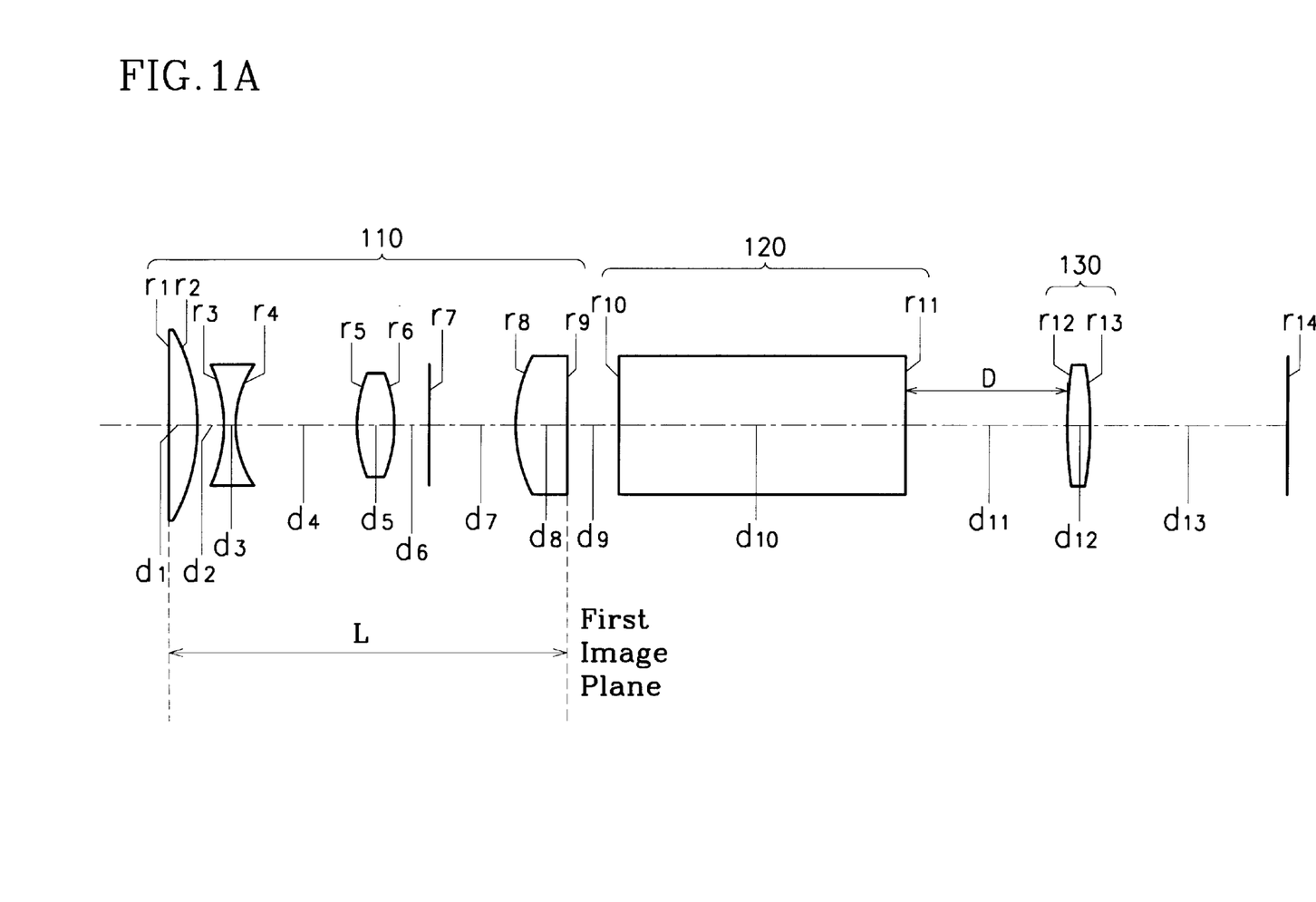
FIGS. 1A–1C are schematic sectional views of a camera finder system according to a first embodiment of the present invention at a telephoto position, a normal position and a wide angle position, respectively.
Figure 1B:
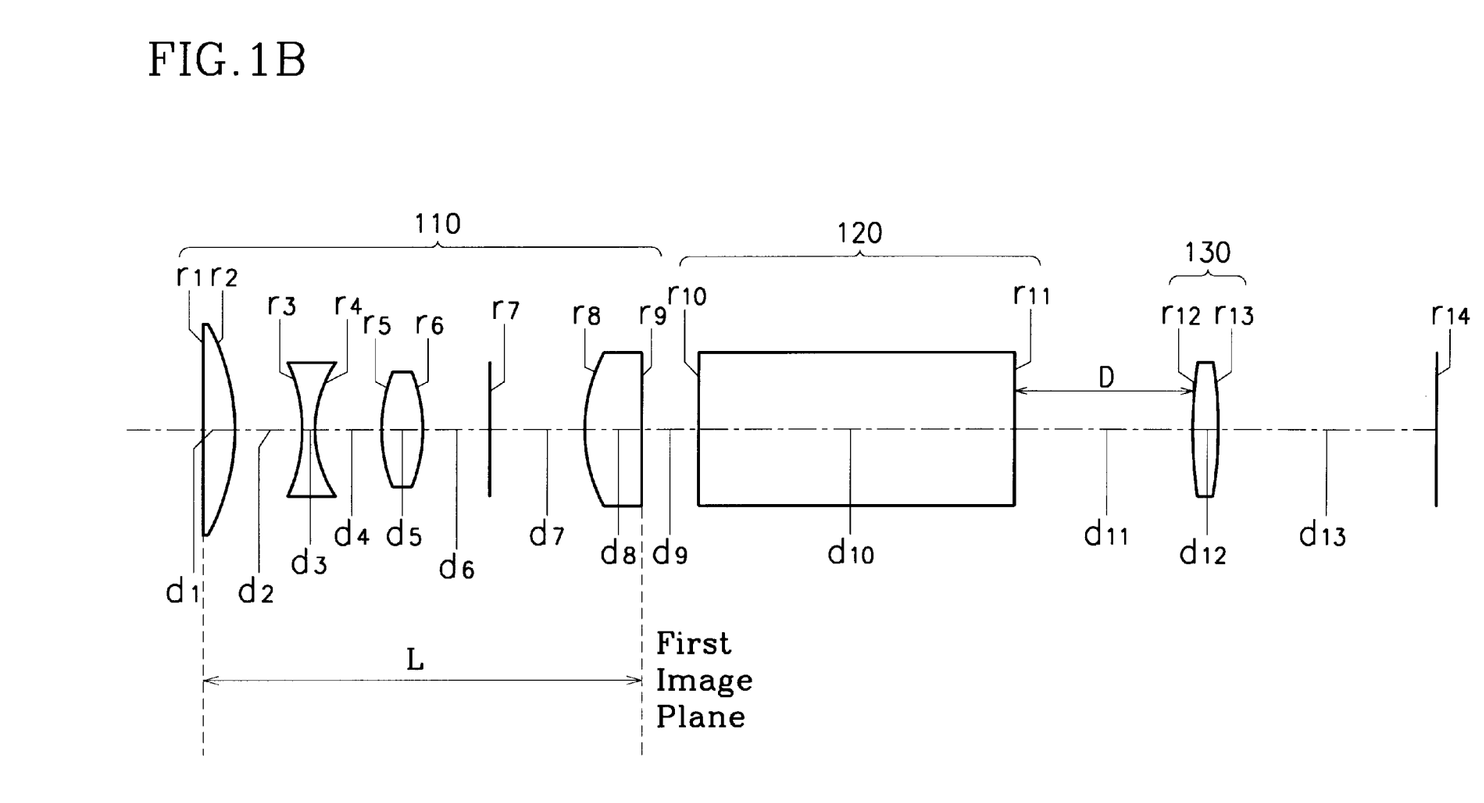
Figure 1C:
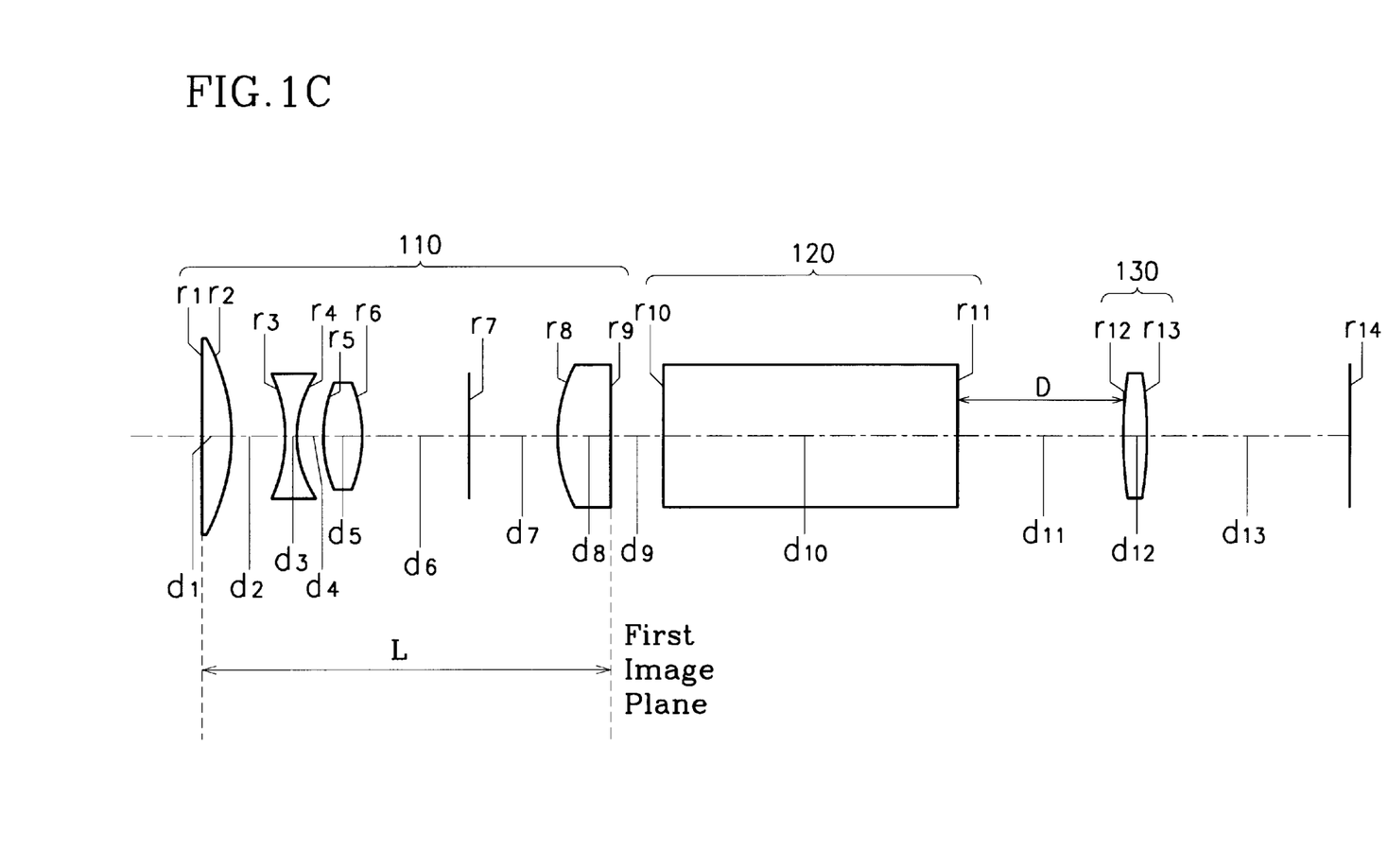

FIGS. 1A–1C illustrate a finder system consistent with a first preferred embodiment according to the present invention. As shown in FIGS. 1A–1C, the finder system comprises, from the object side (i.e., the left side of the Figures), an objective lens system 110, an inverting optical system 120, and an eyepiece system 130.

Objective lens system 110, which has a positive refractive power, forms a first image of the object. Objective lens system 110 comprises a first lens unit (r1, r2) having a positive refractive power, a second lens unit (r3, r4) having a negative refractive power, a third lens unit (r5, r6) having a positive refractive power, and a fourth lens unit (r8, r9) having a positive refractive power. The first lens unit and fourth lens unit each remain in a fixed position. However, the distance between the second lens unit and the third lens unit varies in order to change the magnification of objective lens system 110. The surface represented by r7 is view window of the finder system.

Inverting optical system 120 comprises at least one prism and inverts the first image received from objective lens system 110. Finally, a user observes the inverted image received from inverting optical system 120 through eyepiece system 130. Eyepiece system 130, which has a positive refractive power, moves outward (toward the user) when the camera turns ON and moves inward when the camera turns OFF.

Figure 2A:
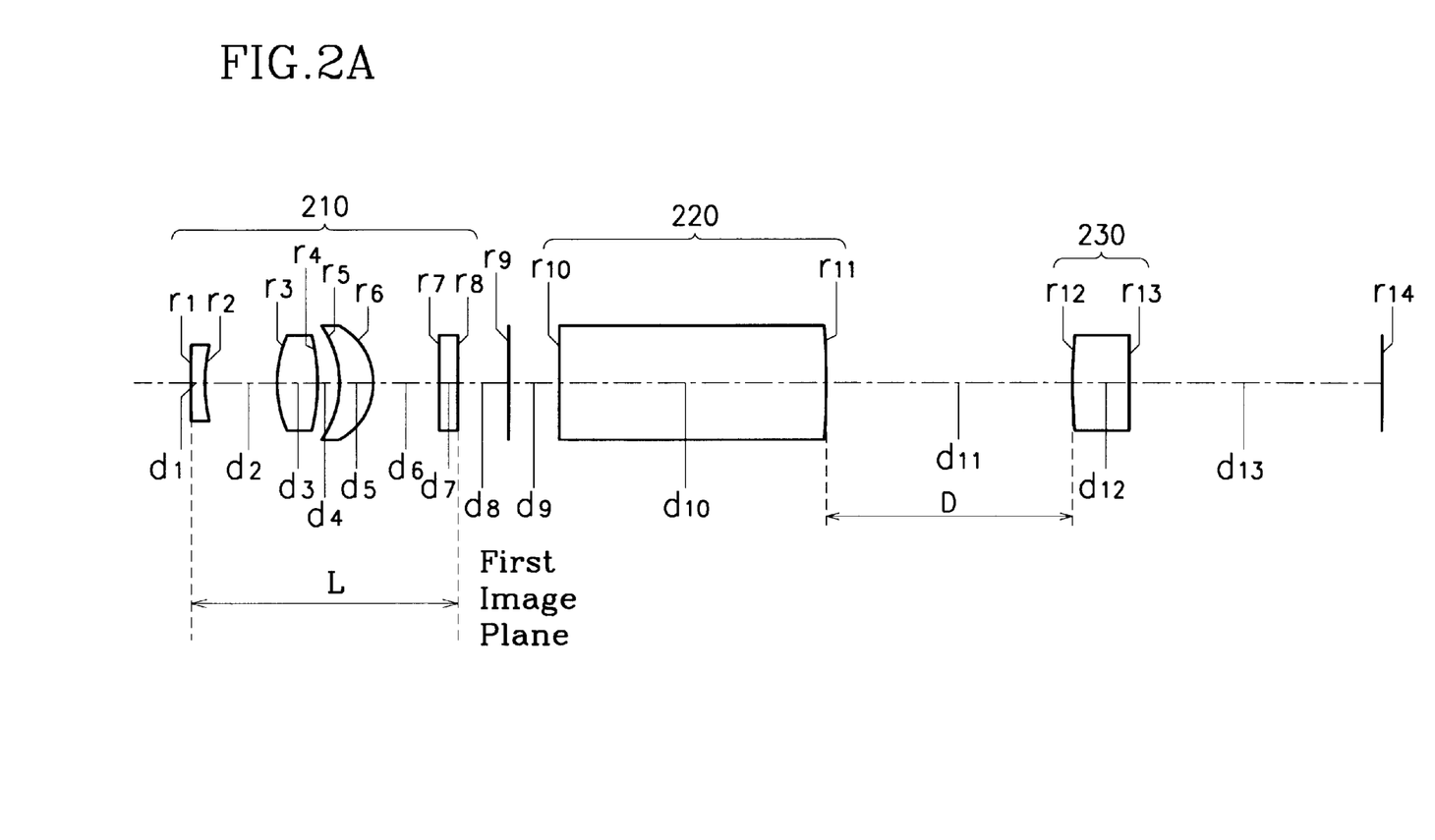
FIGS. 2A–2C are schematic sectional views of a camera finder system according to a second embodiment of the present invention at a telephoto position, a normal position and a wide angle position, respectively.
Figure 2B:
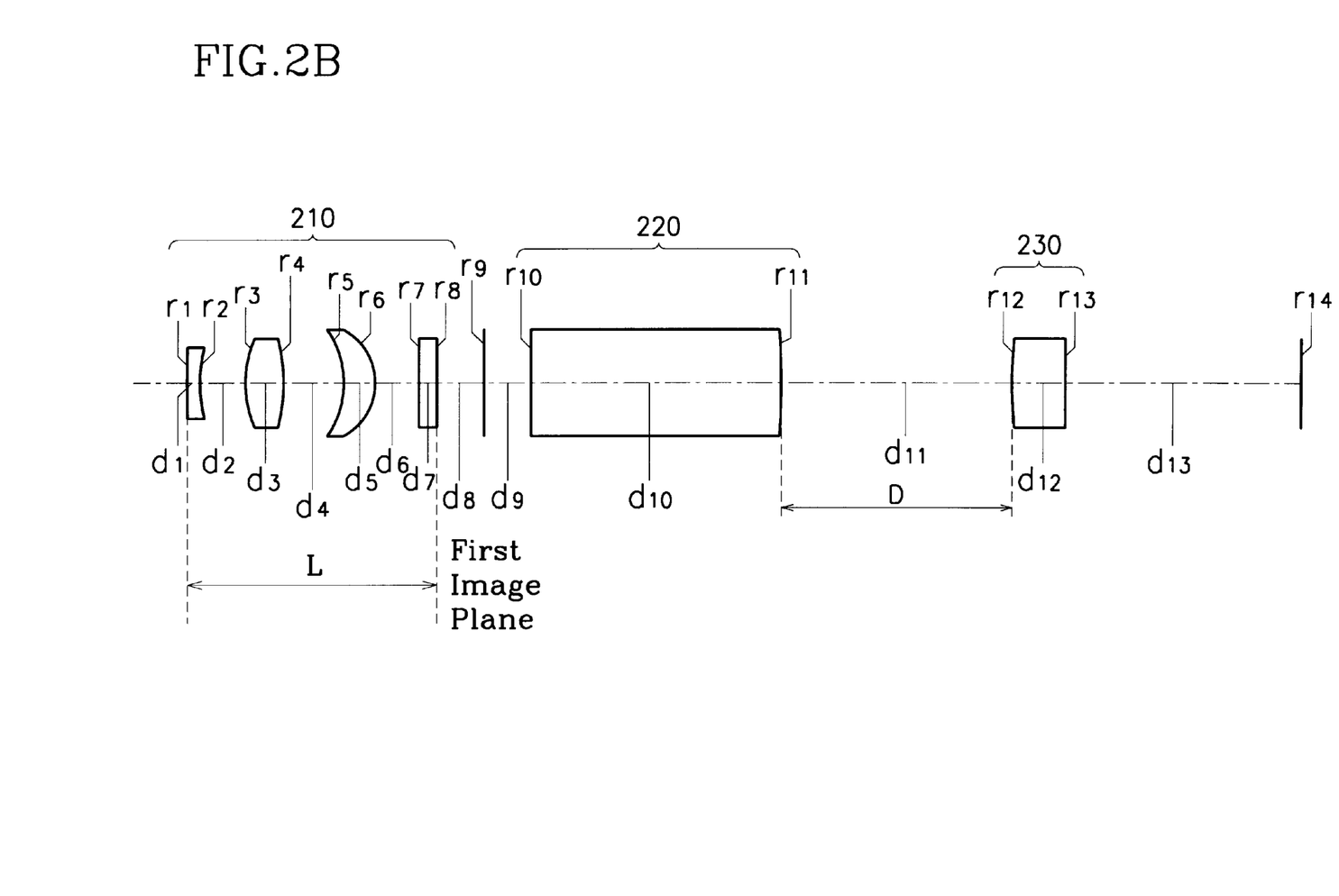
Figure 2C:
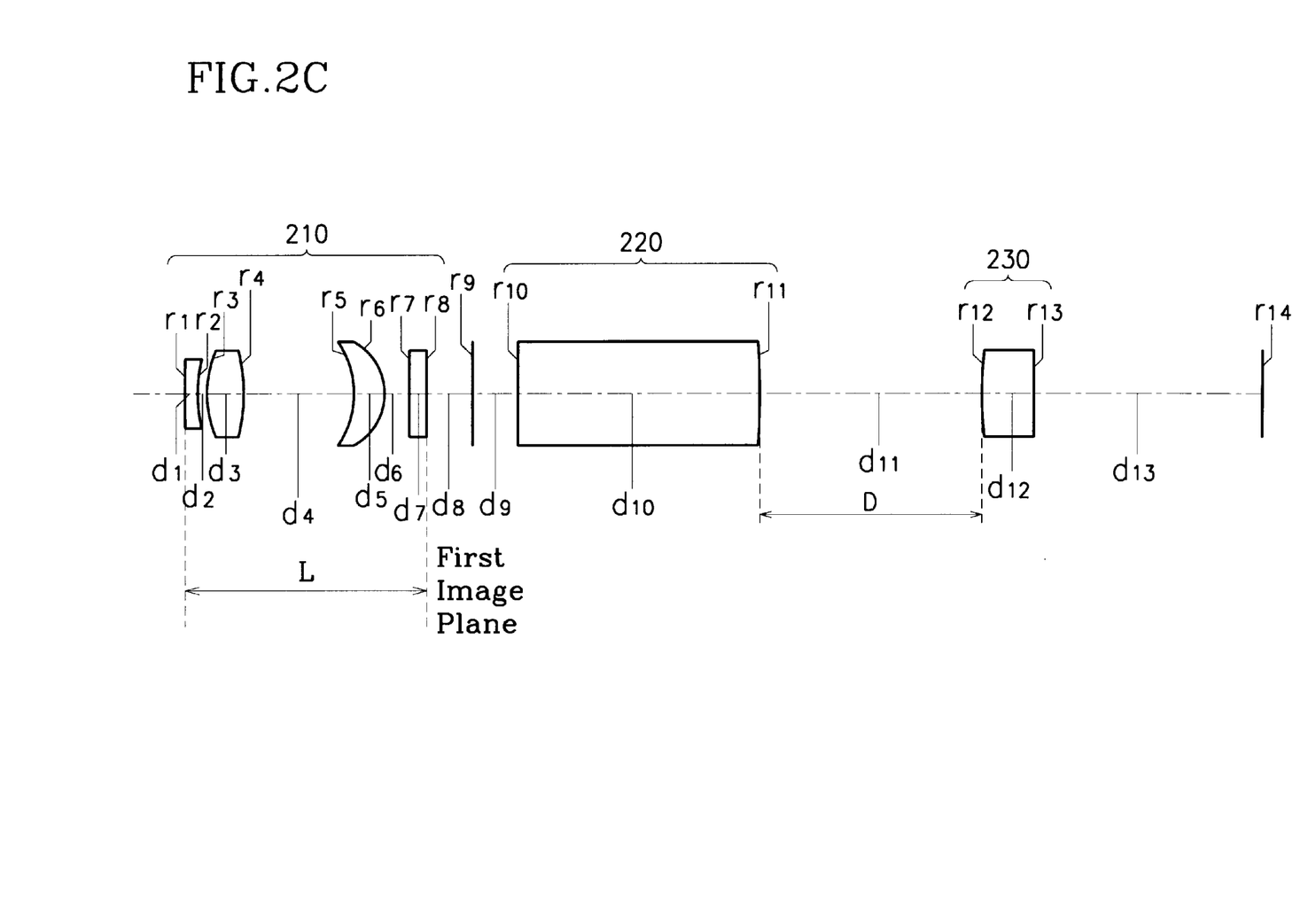

FIGS. 2A–2C illustrate a finder system consistent with a second preferred embodiment according to the present invention. As shown in FIGS. 2A–2C, the finder system comprises (from the object side) an objective lens system 210, an inverting optical system 220 and an eyepiece system 230.

Objective lens system 210, which has a positive refractive power, forms a first image of the object. Objective lens system 210 comprises a first lens unit (r1, r2) having a negative refractive power, a second lens unit (r3, r4) having a positive refractive power, a third lens unit (r5, r6) having a positive refractive power, and a flat plate (r7, r8). The surface represented by r9 is view window of the finder system. Objective lens system 210, inverting optical system 220 and eyepiece system 230 function similarly to the corresponding systems of the first embodiment.

Figure 3:
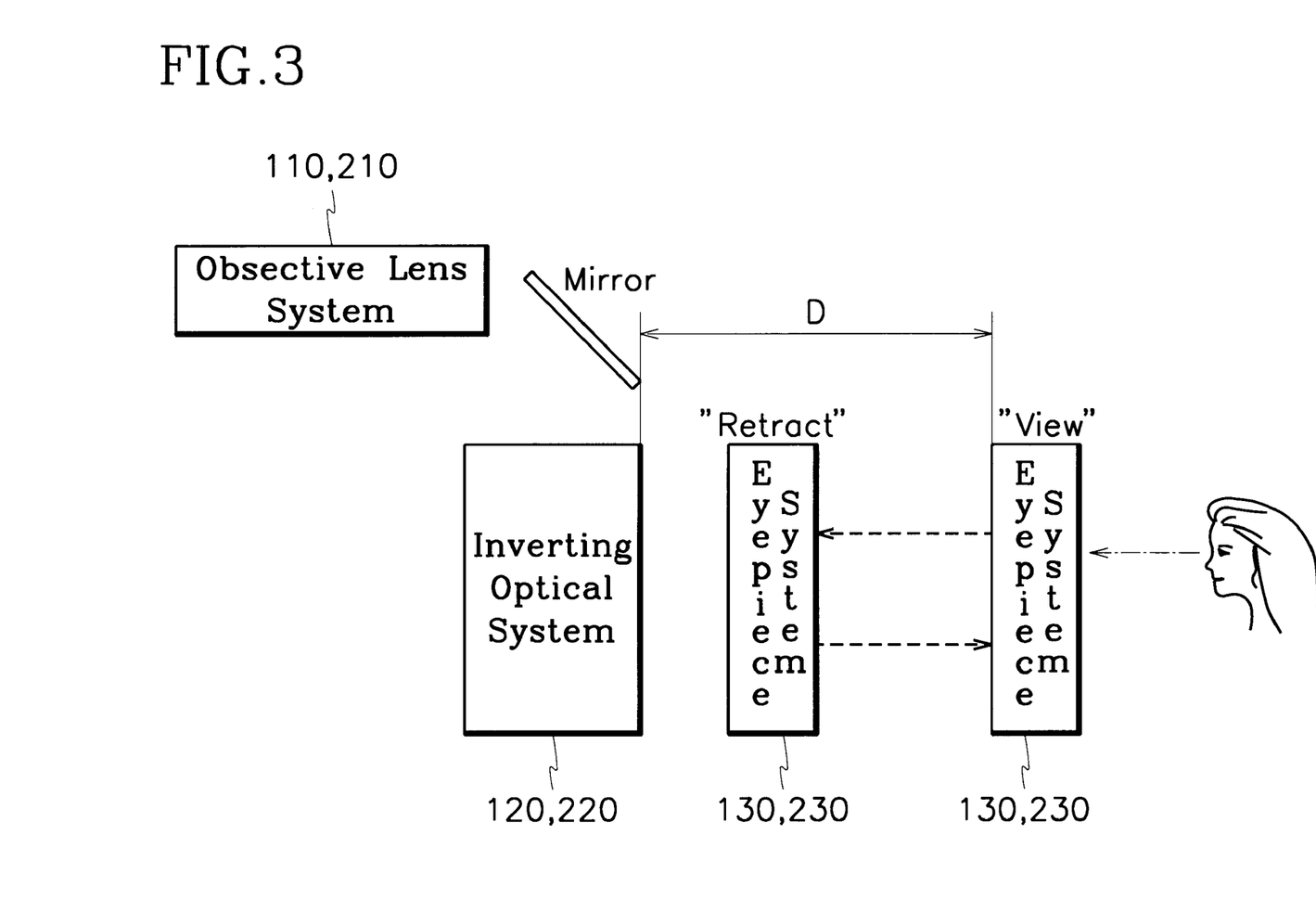
FIG. 3 is a block diagram illustrating the operation of an eyepiece system according to the first or second embodiment.
Figure 4A:
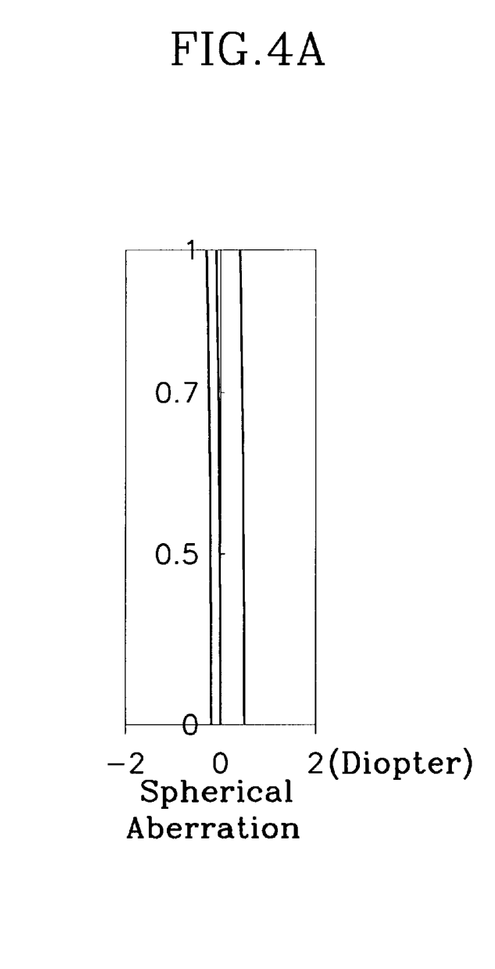
FIGS. 4A–4C show the spherical aberration, astigmatism and distortion curves of a camera finder system according to the first embodiment of the present invention at a wide angle position.
Figure 4B:
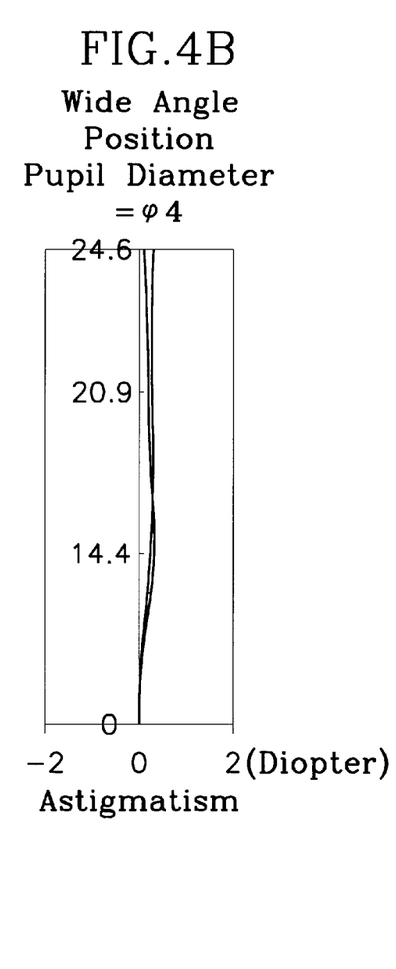
Figure 4C:
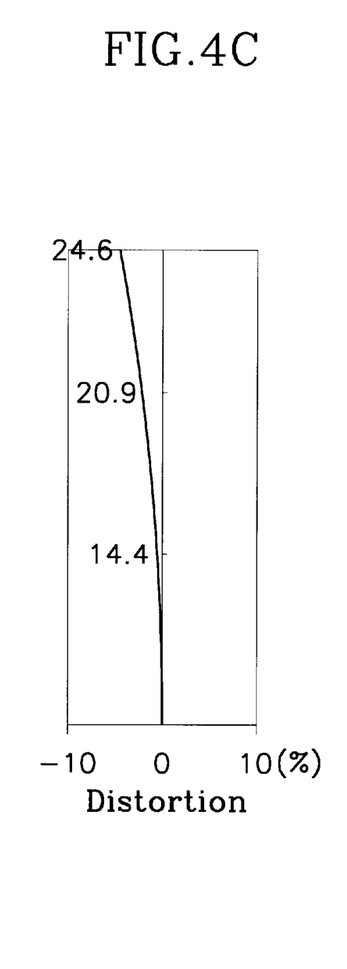
Figure 5A:
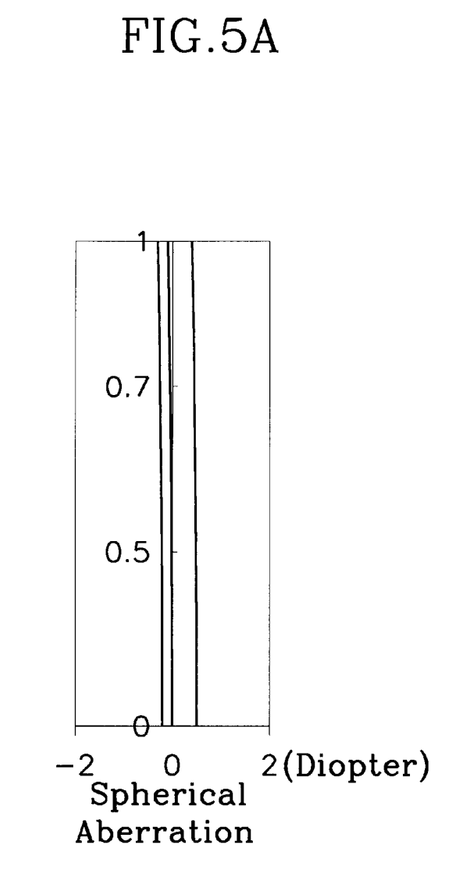
FIGS. 5A–5C show the spherical aberration, astigmatism and distortion curves of a camera finder system according to the first embodiment of the present invention at a normal position.
Figure 5B:
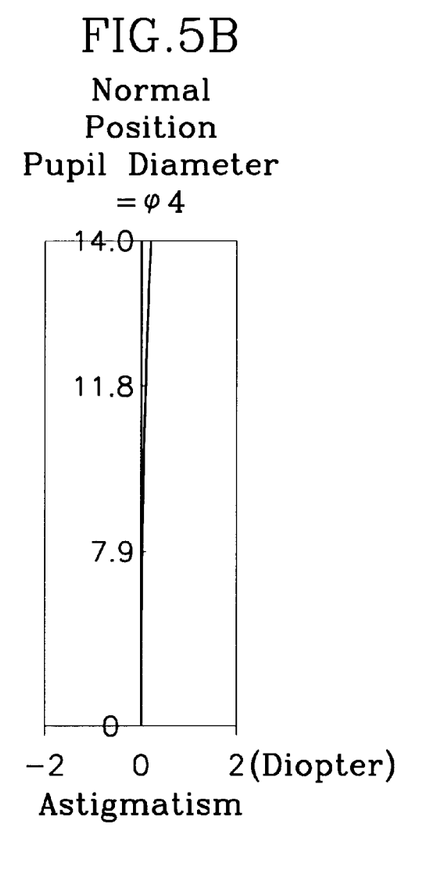
Figure 5C:
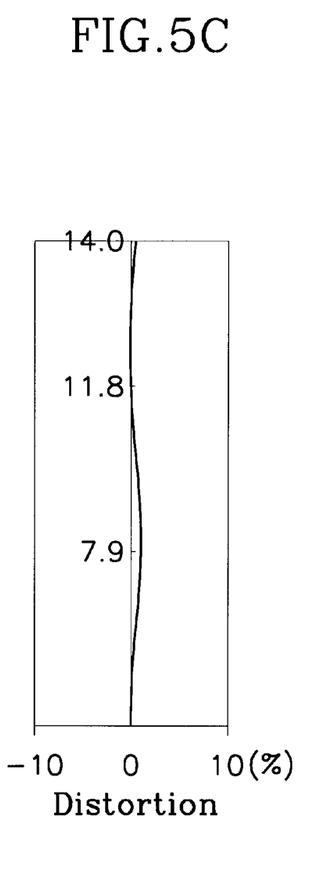
Figure 6A:
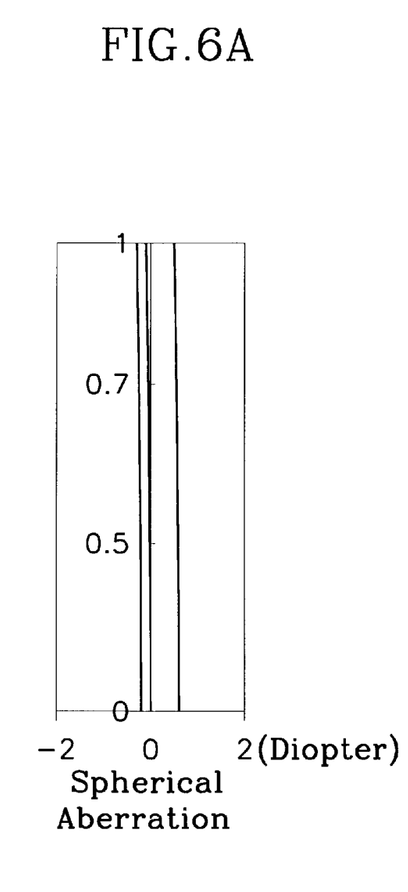
FIGS. 6A–6C show the spherical aberration, astigmatism and distortion curves of a camera finder system according to the first embodiment of the present invention at a telephoto position.
Figure 6B:
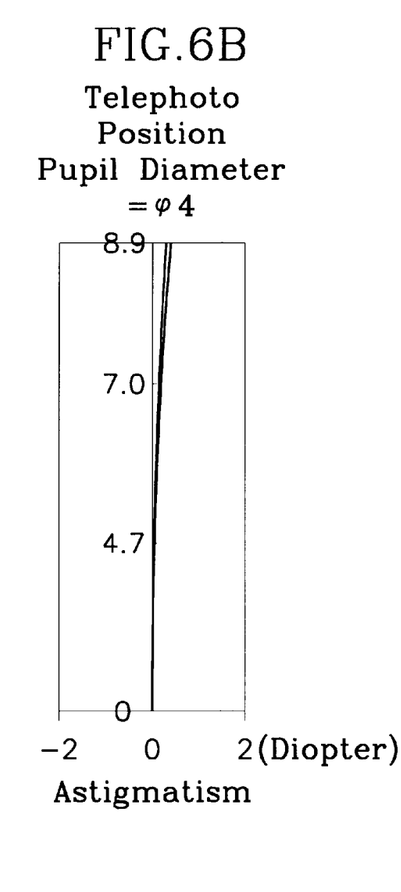
Figure 6C:
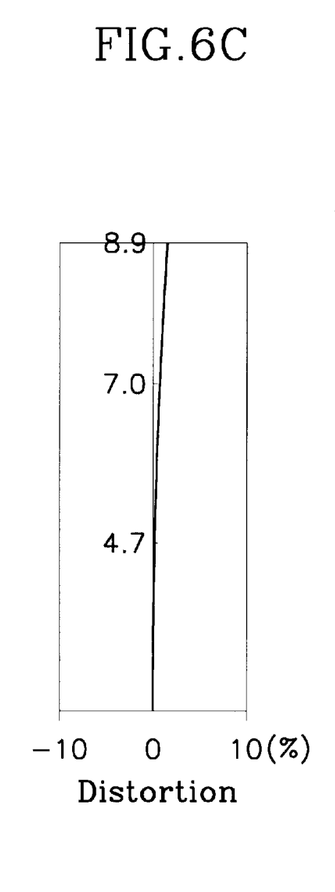
Figure 7A:
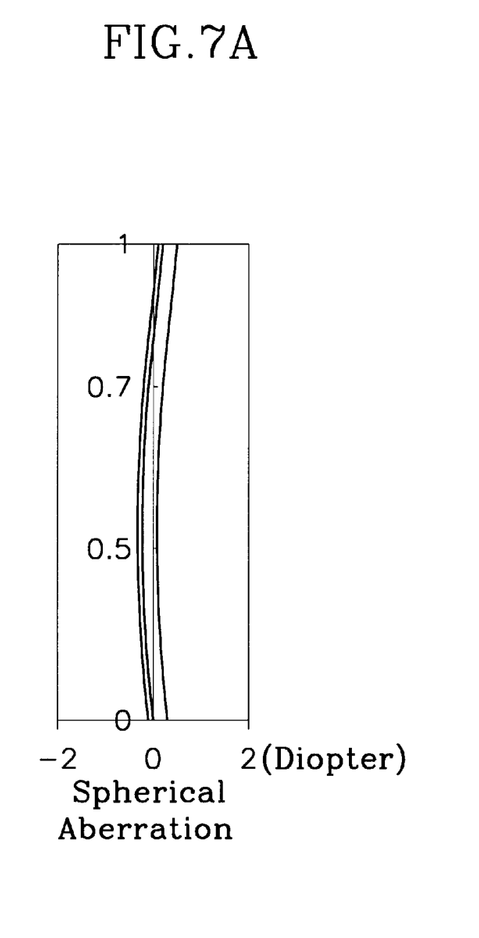
FIGS. 7A–7C show the spherical aberration, astigmatism and distortion curves of a camera finder system according to the second embodiment of the present invention at a wide angle position.
Figure 7B:
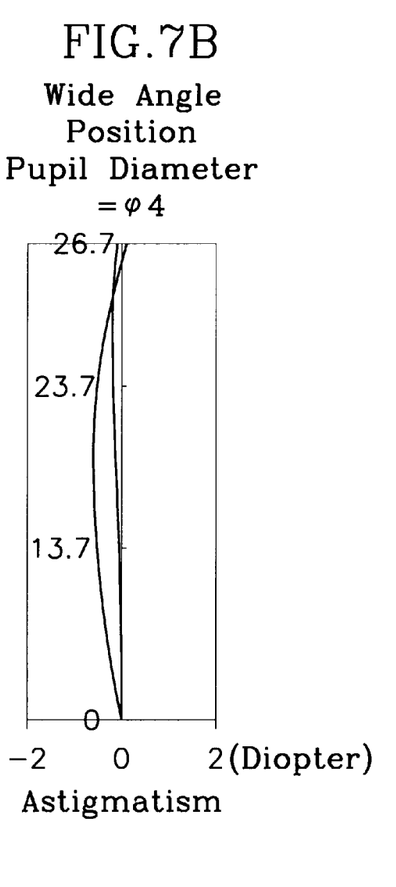
Figure 7C:
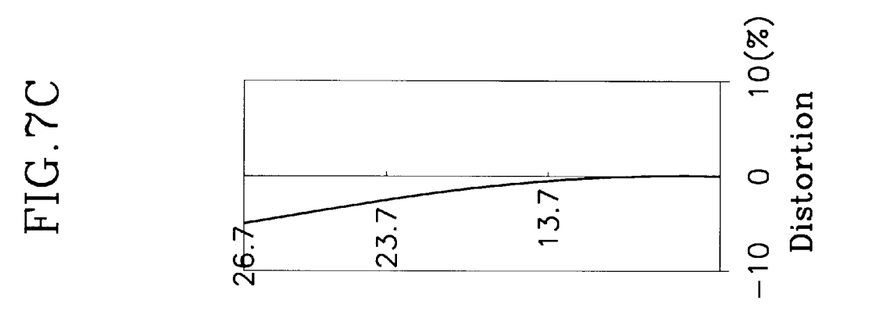
Figure 8A:
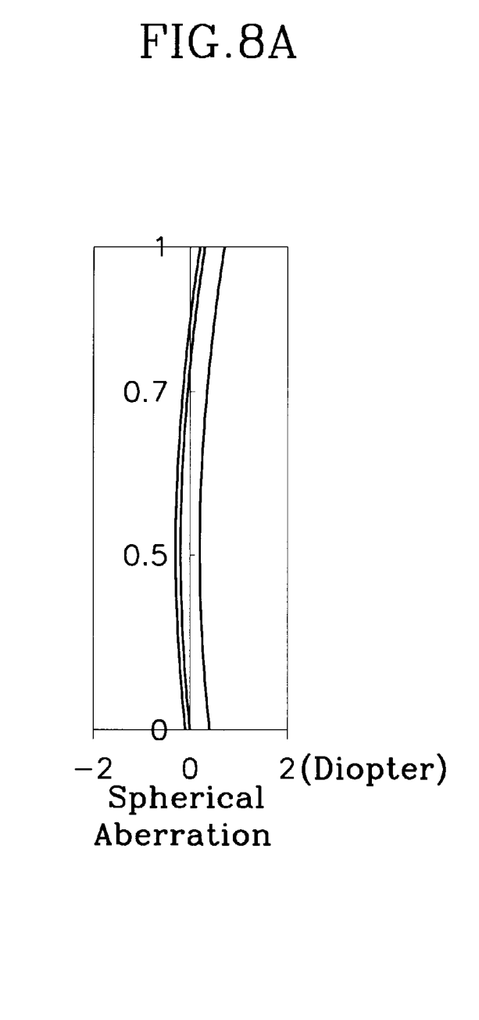
FIGS. 8A–8C show the spherical aberration, astigmatism and distortion curves of a camera finder system according to the second embodiment of the present invention at a normal position.
Figure 8B:
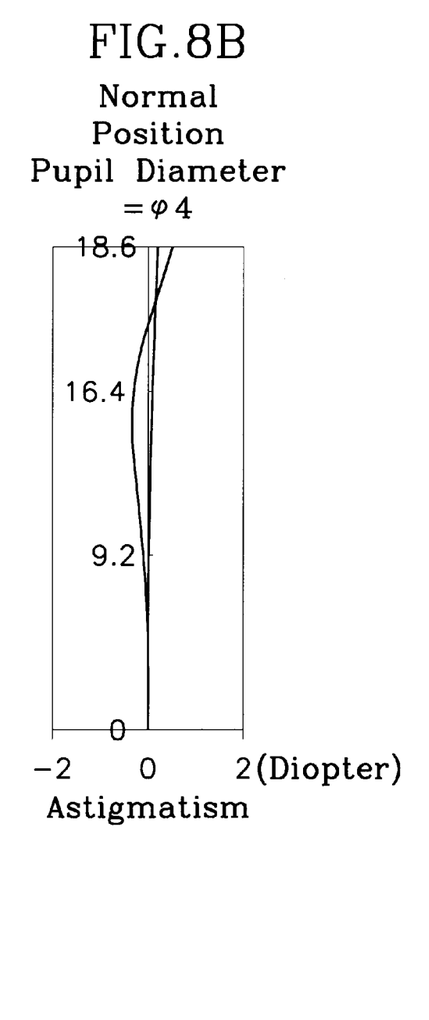
Figure 8C:
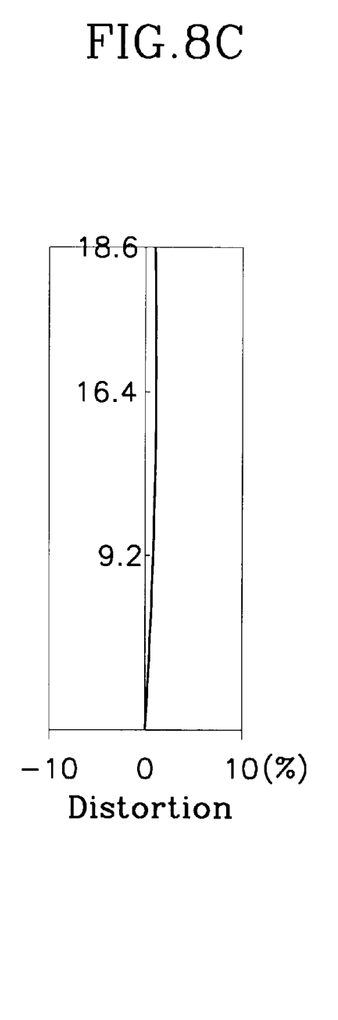
Figure 9A:
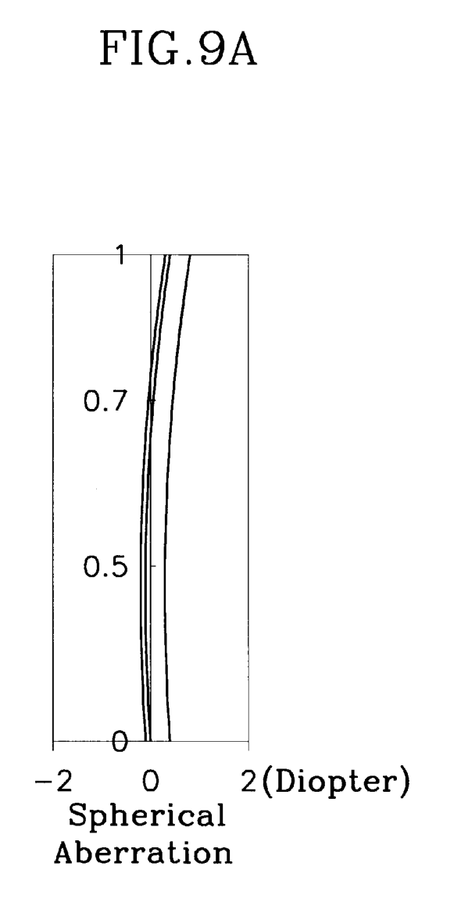
FIGS. 9A–9C show the spherical aberration, astigmatism and distortion curves of a camera finder system according to the second embodiment of the present invention at a telephoto position.
Figure 9B:
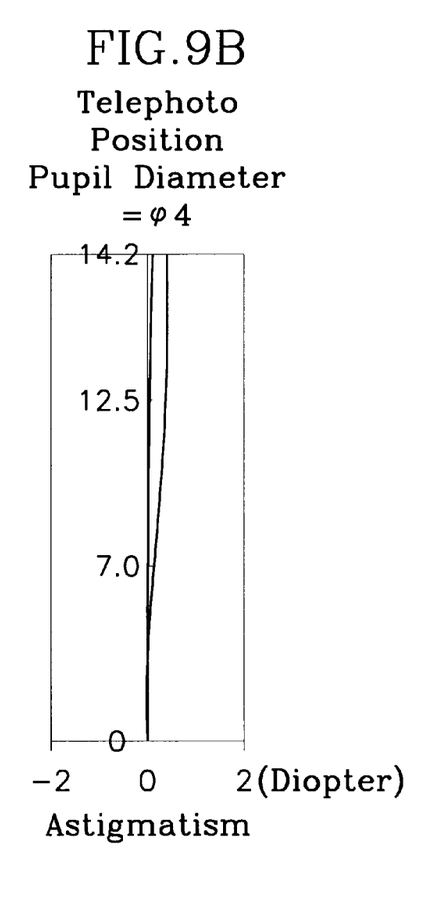
Figure 9C:
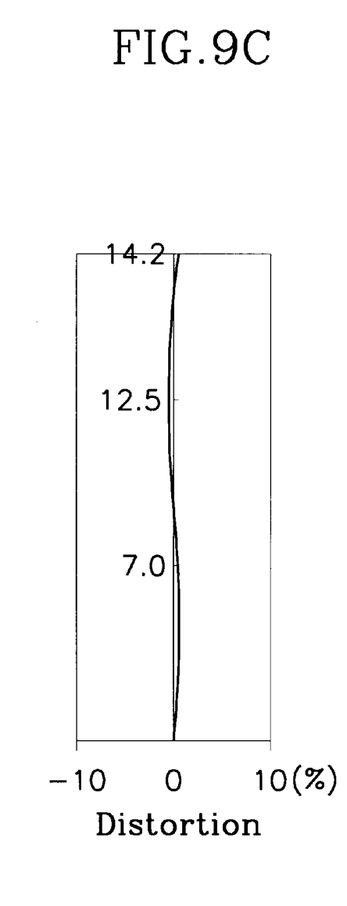

FIG. 3 is a block diagram which illustrates the shift operation of eyepiece system 130 or 230. As shown in FIG. 3, when the camera is turned OFF, eyepiece system 130, 230 is placed in a "Retract" position. When a user turns the camera ON, eyepiece system 130, 230 moves toward the user's eye (the "View" position) so that the user can view an object without touching the camera body. Alternatively, eyepiece system 130, 230 may move outward from the camera in a direction perpendicular to a line of sight between the camera and the object. In either case, when the user then turns the camera OFF, eyepiece system 130, 230 moves from the "View" position back to the "Retract" position. This function enables the camera to become compact and easily portable when eyepiece system 130, 230 is placed in the "Retract" position, while also allowing the user to easily view the object when eyepiece system 130, 230 is placed in the "View" position.

When eyepiece system 130 or 230 is in the "View" position, finder systems consistent with the present invention satisfy the following conditions:

$$12 \leq D \leq 20 \quad (1)$$

$$1.0 \leq L/D \leq 4.5 \quad (2)$$

$$0.3 \leq fw/D \leq 1.0 \quad (3)$$

where:

D represents a distance between an exit surface of inverting optical system 120, 220 and an entrance surface of eyepiece system 130, 230;

L represents a distance between an entrance surface of objective optical system 110, 210 and a first image plane; and fw represents a focal length of objective lens system 110, 210 at a wide angle position.

Conditions 1, 2 and 3 relate to the distance eyepiece system 130, 230 protrudes from the camera toward the user. If the upper limit of condition (1) is violated, the finder system will have poor aberration characteristics and a low magnification. If the lower limit of condition (1) is violated, it is not necessary to retract eyepiece system 130, 230 when the camera is turned OFF since D is small.

If the upper limit of condition (2) is violated, the total length of the finder system becomes long and the distance D becomes short. If the lower limit of condition (2) is violated, the finder system's magnification decreases, making it difficult to view an object.

If the upper limit of condition (3) is violated, the distance D becomes short. If the lower limit of condition (3) is violated, the refractive power of the objective lens system becomes high and all aberrations become large.

A coefficient and the shape of an aspherical lens surface of a finder system consistent with the present invention, and which satisfies any of the above conditions (1) to (3), is represented by the following equation.

$$z = \frac{ch^2}{1 + (1 - (K+1)c^2h^2)^{1/2}} + Ah^4 + Bh^6 + Ch^8 + Dh^{10}$$

where:

z represents a distance from a lens vertex to an optical axis;

h represents a radial distance from the optical axis;

c represents a reciprocal of the radius of curvature;

K represents a conic constant; and

A, B. C and D are aspherical coefficients.

Values which satisfy the above-mentioned conditions (1) to (3), according to preferred embodiments of the invention, are described in the Tables below. In each of these Tables, all units of length are denominated in millimeters and the following variables are used:

$r_i$ (i=1 to 14) represents a radius of curvature;

$d_i$ (i=1 to 14) represents the thickness of a lens or the length between lens units;

nd represents the d-line refractive index of a lens unit; and v represents the Abbe number of a lens unit.

Values for the first embodiment consistent with the present invention are shown in Table 1, where: the view angle ranges from 49.3 to 16.7, and the magnification ranges from –0.26 x to –0.76 x.

TABLE 1

| Surface No. | Radius of Curvature ($r_i$) | Distance ($d_i$) | Refractive Index (nd) | Abbe Number (v) |
|---|---|---|---|---|
| 1 | ∞ | 2.50 | 1.49176 | 57.4 |
| 2* | –16.950 | d2 | | |
| 3 | –12.780 | 1.00 | 1.49176 | 57.4 |
| 4* | 9.330 | d4 | | |
| 5* | 12.180 | 3.24 | 1.49176 | 57.4 |
| 6 | –12.040 | d6 | | |
| 7 | ∞ | 11.00 | | |
| 8 | 12.930 | 4.50 | 1.49176 | 57.4 |
| 9 | ∞ | 4.50 | | |
| 10 | ∞ | 25.00 | 1.49176 | 57.4 |
| 11 | ∞ | 14.00 | | |
| 12* | 38.188 | 2.00 | 1.49176 | 57.4 |
| 13 | –32.425 | 17.00 | | |
| 14 | ∞ | 0.00 | | |

*represents an aspherical surface.

Coefficients of the aspherical lens surfaces r2, r4, r5 and r12 are shown in Table 3, and the variable distances d2, d4 and d6 (according to zoom positions) are shown in Table 2.

TABLE 2

| | View Angle(49.3°) | View Angle(28.0°) | View Angle(16.7°) |
|---|---|---|---|
| d2 | 2.574 | 7.476 | 6.354 |
| d4 | 17.436 | 10.047 | 2.866 |
| d6 | 4.750 | 7.237 | 15.635 |

TABLE 3

| | r2 | r4 |
|---|---|---|
| k | 0.1449415552690 × 10 | –0.5149814004095 × 10 |
| A | 0.1600382072755 × 10⁻³ | 0 |

TABLE 3-continued

| | | |
|---|---|---|
| B | 0 | 0 |
| C | 0 | 0 |
| D | 0 | 0 |

| | r5 | r12 |
|---|---|---|
| k | $-0.7739281205081 \times 10$ | $-0.9270624198794 \times 10$ |
| A | $0.9930074927172 \times 10^{-4}$ | 0 |
| B | $-0.1734751045049 \times 10^{-5}$ | 0 |
| C | 0 | 0 |
| D | 0 | 0 |

Values for the second embodiment of the present invention are shown in Table 4, where: the view angle ranges from 53.3 to 28.4, and the magnification from −0.27 x to −0.48 x.

TABLE 4

| Surface No. | Radius of Curvature (ri) | Distance (di) | Refractive Index (nd) | Abbe Number (ν) |
|---|---|---|---|---|
| 1 | 134.206 | 1.00 | 1.49176 | 57.4 |
| 2 | 13.039 | d2 | | |
| 3* | 9.413 | 3.19 | 1.49176 | 57.4 |
| 4 | −15.461 | d4 | | |
| 5 | −7.904 | 2.67 | 1.49176 | 57.4 |
| 6* | −5.080 | d6 | | |
| 7 | ∞ | 1.50 | 1.51680 | 64.2 |
| 8 | ∞ | 4.00 | | |
| 9 | ∞ | 4.00 | | |
| 10 | ∞ | 21.23 | 1.49176 | 57.4 |
| 11 | −42.751 | 19.52 | | |
| 12* | 24.619 | 4.50 | 1.49176 | 57.4 |
| 13 | −1776.300 | 20.00 | | |
| 14 | ∞ | 0.00 | | |

*represent an aspherical surface.

Coefficients of the aspherical surfaces r3, r6 and r12 are shown in Table 6, and variable distances d2, d4 and d6 (according to zoom positions) are shown in Table 5.

TABLE 5

| | View Angle (53.3°) | View Angle (37.1°) | View Angle (28.4°) |
|---|---|---|---|
| d2 | 6.209 | 2.870 | 0.600 |
| d4 | 2.000 | 7.622 | 12.504 |
| d6 | 9.084 | 6.809 | 4.184 |

TABLE 6

| | r3 | r6 |
|---|---|---|
| k | $0.1856035769103 \times 10$ | $-0.2654416209042 \times 10$ |
| A | $-0.2870704535885 \times 10^{-4}$ | $-0.1134320521804 \times 10^{-2}$ |
| B | $-0.7010325154469 \times 10^{-4}$ | $0.2573407074869 \times 10^{-4}$ |
| C | $0.3557804500783 \times 10^{-5}$ | $-0.1654425508852 \times 10^{-6}$ |
| D | $-0.8269163951382 \times 10^{-7}$ | $-0.4237697419882 \times 10^{-8}$ |

| | r12 |
|---|---|
| k | $-0.3059040417335 \times 10^{+2}$ |
| A | $0.1836437743941 \times 10^{-3}$ |
| B | $-0.8559254289816 \times 10^{-6}$ |
| C | $-0.3608959124944 \times 10^{-7}$ |
| D | $0.5277485472033 \times 10^{-9}$ |

Spherical aberration data for the first and second embodiments are shown in Tables 7 to 9, and astigmatism and distortion data are shown in Tables 10 to 12. The units of spherical aberration and astigmatism in these Tables are diopters. In addition, FIGS. 4 to 9 illustrate the superior aberration, astigmatism and distortion characteristics of the first and second preferred embodiments of the invention.

TABLE 7

Spherical Aberration (Wide Angle Position)

| Height of Incident Ray | First Embodiment | | | Second Embodiment | | |
|---|---|---|---|---|---|---|
| | d-line | C-line | F-line | d-line | C-line | F-line |
| 0 | 0 | −0.20 | 0.47 | 0 | −0.15 | 0.36 |
| 0.5 | −0.02 | −0.22 | 0.44 | −0.17 | −0.32 | 0.18 |
| 0.7 | −0.04 | −0.24 | 0.42 | −0.11 | −0.26 | 0.25 |
| 1 | −0.08 | −0.27 | 0.38 | 0.23 | 0.07 | 0.60 |

TABLE 8

Spherical Aberration (Normal Position)

| Height of Incident Ray | First Embodiment | | | Second Embodiment | | |
|---|---|---|---|---|---|---|
| | d-line | C-line | F-line | d-line | C-line | F-line |
| 0 | 0 | −0.21 | 0.50 | 0 | −0.16 | 0.37 |
| 0.5 | −0.03 | −0.24 | 0.47 | −0.13 | −0.28 | 0.23 |
| 0.7 | −0.05 | −0.26 | 0.45 | −0.05 | −0.20 | 0.32 |
| 1 | −0.10 | −0.31 | 0.40 | 0.32 | 0.16 | 0.70 |

TABLE 9

Spherical Aberration (Telephoto Position)

| Height of Incident Ray | First Embodiment | | | Second Embodiment | | |
|---|---|---|---|---|---|---|
| | d-line | C-line | F-line | d-line | C-line | F-line |
| 0 | 0 | −0.25 | 0.58 | 0 | −0.16 | 0.40 |
| 0.5 | −0.02 | −0.27 | 0.56 | −0.05 | −0.22 | 0.33 |
| 0.7 | −0.04 | −0.28 | 0.55 | 0.07 | −0.10 | 0.46 |
| 1 | −0.08 | −0.30 | 0.52 | 0.43 | 0.26 | 0.84 |

TABLE 10

Astigmatism & Distortion (Wide Angle Position)

| First Embodiment | | | | Second Embodiment | | | |
|---|---|---|---|---|---|---|---|
| | Astigmatism | | | | Astigmatism | | |
| Field angle | M image | S image | Distortion % | Field angle | M image | S image | Distortion % |
| 0 | 0 | 0 | 0 | 0 | 0 | 0 | 0 |
| 14.4 | 0.28 | 0.20 | −1.02 | 13.7 | −0.47 | −0.04 | −0.34 |
| 20.9 | 0.23 | 0.34 | −3.32 | 23.7 | −0.59 | −0.20 | −2.92 |
| 24.6 | 0.17 | 0.40 | −5.60 | 26.7 | 0.05 | −0.08 | −5.45 |

TABLE 11

Astigmatism & Distortion (Normal Position)

| | First Embodiment | | | | Second Embodiment | | |
|---|---|---|---|---|---|---|---|
| | Astigmatism | | | | Astigmatism | | |
| Field angle | M image | S image | Distortion % | Field angle | M image | S image | Distortion % |
| 0 | 0 | 0 | 0 | 0 | 0 | 0 | 0 |
| 7.9 | 0.01 | 0.08 | 0.69 | 9.2 | −0.04 | 0.04 | 0.72 |
| 11.8 | 0.03 | 0.18 | 0.19 | 16.4 | −0.29 | 0.16 | 1.00 |
| 14.0 | 0.04 | 0.25 | 0.27 | 18.6 | 0.73 | 0.28 | 0.95 |

TABLE 12

Astigmatism & Distortion (Telephoto Position)

| | First Embodiment | | | | Second Embodiment | | |
|---|---|---|---|---|---|---|---|
| | Astigmatism | | | | Astigmatism | | |
| Field angle | M image | S image | Distortion % | Field angle | M image | S image | Distortion % |
| 0 | 0 | 0 | 0 | 0 | 0 | 0 | 0 |
| 4.7 | 0.06 | 0.09 | 0.48 | 7.0 | −0.02 | 0.05 | 0.21 |
| 7.0 | 0.25 | 0.24 | 1.20 | 12.5 | 0.04 | 0.40 | −0.34 |
| 8.3 | 0.51 | 0.38 | 1.89 | 14.2 | 0.12 | 0.44 | 0.31 |

Finder systems consistent with the first and second embodiments of the present invention may satisfy conditions (1) to (3) using the values shown in Table 13.

TABLE 13

| | First Embodiment | Second Embodiment |
|---|---|---|
| L | 47.00 | 25.65 |
| fw | 9.15 | 9.97 |
| D | 14.00 | 19.52 |
| L/D | 3.36 | 1.31 |
| fw/D | 0.65 | 0.51 |

As described above, finder systems consistent with the present invention provide an eyepiece system which protrudes outward from the camera only when the camera-is turned ON: Accordingly, the camera is compact and easily portable, while also allowing a user to accurately and easily view an object when the camera is in use.

It will be apparent to those skilled in the art that various modifications and variations can be made to the system and method of the present invention without departing from the spirit or scope of the invention. The present invention covers the modifications and variations of this invention provided they come within the scope of the appended claims and their equivalents.

What is claimed is:

1. A camera finder system for observing an object and for use with a camera, the system comprising:
    an objective lens system for forming a first image of the object and for magnifying the first image;
    an inverting optical system for inverting the first image received from the objective optical system;
    an eyepiece system for observing the inverted image received from the inverting optical system; and
    wherein the following conditions are satisfied:

$12 \leq D \leq 20$, and $1.0 \leq L/D \leq 4.5$, where:
        D represents a distance between an exit surface of the inverting optical system and an entrance surface of the eyepiece system; and
        L represents a distance between an entrance surface of the objective lens system and a first image plane.

2. The finder system of claim 1, wherein the following condition is satisfied:

$0.3 \leq fw/D \leq 1.0$, where:
        fw represents a focal length of the objective lens system at a wide angle position.

3. The finder system of claim 1, wherein:
    the eyepiece system moves outward from the camera when the camera is turned ON, and the eyepiece system moves inward toward the camera when the camera is turned OFF.

4. The finder system of claim 1, wherein the inverting optical system further includes a prism.

5. The finder system of claim 1, wherein the objective lens system comprises:
    a first lens unit having a positive refractive power;
    a second lens unit having a negative refractive power;
    a third lens unit having a positive refractive power; and
    a fourth lens unit having a positive refractive power,
    wherein the first lens unit and the fourth lens unit are in fixed positions, and wherein the magnification of the objective lens system can be changed by varying a distance between the second lens unit and the third lens unit.

6. The finder system of claim 1, wherein the objective lens system comprises:
    a first lens unit having a positive refractive power;
    a second lens unit having a negative refractive power;
    a third lens unit having a positive refractive power; and
    a fourth lens unit having a positive refractive power,
    wherein the first lens unit is in a fixed position, and wherein the magnification of the objective lens system can be changed by varying a distance between the second lens unit and the third lens unit.

* * * * *